US012699694B2

(12) United States Patent    (10) Patent No.:   US 12,699,694 B2

Zheng et al.    (45) Date of Patent:    Aug. 4, 2026

---

(54) RULE BASED METADATA PARTITIONING

(71) Applicant: Cloudian Holdings, Inc., San Mateo, CA (US)

(72) Inventors: Wenqin Zheng, San Mateo, CA (US); Bharatendra Boddu, San Mateo, CA (US)

(73) Assignee: Cloudian Holdings, Inc., San Mateo, CA (US)

( * ) Notice: Subject to any disclaimer, the term of this patent is extended or adjusted under 35 U.S.C. 154(b) by 0 days.

(21) Appl. No.: 18/742,462

(22) Filed: Jun. 13, 2024

(65) Prior Publication Data

US 2024/0419661 A1    Dec. 19, 2024

Related U.S. Application Data

(60) Provisional application No. 63/507,827, filed on Jun. 13, 2023.

(51) Int. Cl.

| | |
|---|---|
| *G06F 16/24* | (2019.01) |
| *G06F 16/2453* | (2019.01) |
| *G06F 16/27* | (2019.01) |
| *G06F 16/28* | (2019.01) |

(52) U.S. Cl.

CPC ........ *G06F 16/2453* (2019.01); *G06F 16/278* (2019.01); *G06F 16/285* (2019.01)

(58) Field of Classification Search

CPC .................................................. G06F 16/2453

USPC ........................................................ 707/791

See application file for complete search history.

(56) References Cited

U.S. PATENT DOCUMENTS

| | | | | |
|---|---|---|---|---|
| 2008/0270361 A1* | 10/2008 | Meyer | ..................... | G06F 16/35 |
| 2015/0135327 A1* | 5/2015 | Wall | ................... | G06F 21/6218 |
| | | | | 726/26 |
| 2021/0149918 A1* | 5/2021 | Finkler | ................. | G06N 20/00 |

* cited by examiner

*Primary Examiner* — Syling Yen

(74) *Attorney, Agent, or Firm* — Crowell & Moring LLP

(57) ABSTRACT

Rule based metadata partitioning may be used for metadata from a distributed database. The partitioning is based on rules for different buckets. The rules may be defined based on a defined set of syntax or using a predefined rule template. The partitioning may include dynamic adjustments and include auto detection for access patterns that are used for updating or creating new rules.

12 Claims, 1 Drawing Sheet

<u>100</u>

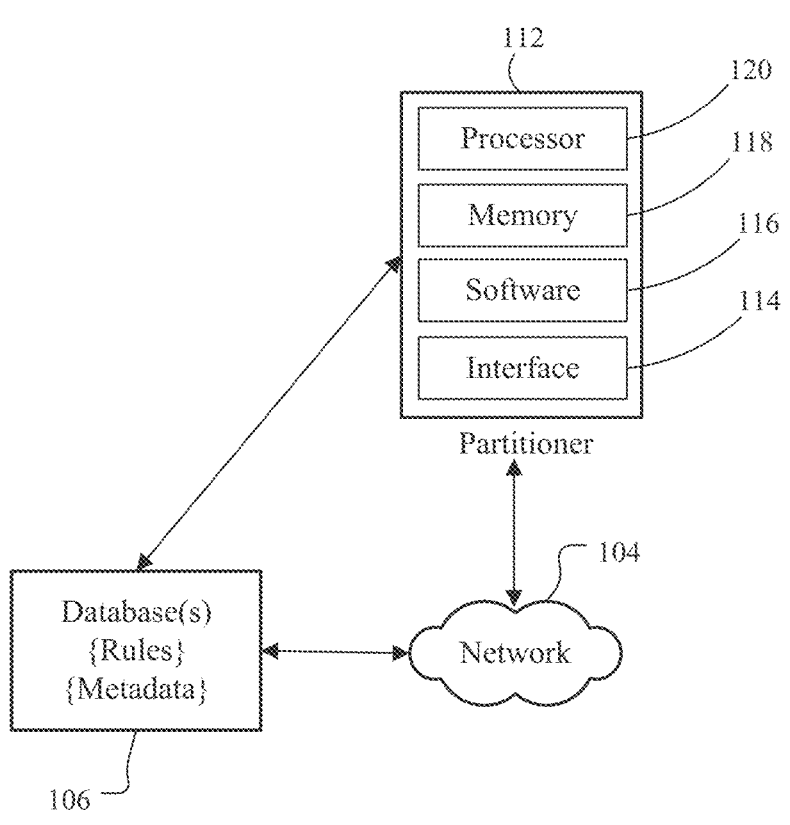

RULE BASED METADATA PARTITIONING

CROSS REFERENCE

This application is based on and claims the benefit of priority to U.S. Provisional Patent Application No. 63/507,827, filed on Jun. 13, 2023, which is herein incorporated by reference in its entirety.

TECHNICAL FIELD OF THE INVENTION

The present invention relates to a system or method for metadata partitioning using rules.

BACKGROUND

In an object storage system metadata stores attributes corresponding to an object. A metadata database is used to organize the data for efficient access. For fault tolerance and to support high scalability, the metadata database may be stored on multiple nodes and the metadata may be partitioned to each node using a consistent hashing method. The partition strategy may have a significant impact on an access of metadata. Metadata of an object may be uniquely identified using the object name and prefixed with a bucket name. If metadata of a bucket is stored in a single partition then the scalability will be limited to a single node capacity. If metadata is stored using multiple rows then it may cause performance impact when reading metadata or when trying to get a range of metadata entries in the sorting order of keys. Object storage may support storing metadata for different applications and each application may have a specific hierarchy of organizing objects in a bucket. A single scheme of storing metadata may not be efficient for all the workloads.

BRIEF SUMMARY

The present invention relates to a method, system or apparatus and/or computer program product for metadata partitioning. The metadata may be from a distributed database that is partitioned based on rules for different buckets. The rules may be defined based on a defined set of syntax or using a predefined rule template. The partitioning may include dynamic adjustments and may include auto detection for access patterns that are used for updating or creating new rules.

BRIEF DESCRIPTION OF THE DRAWINGS

The FIGURES illustrate principles of the invention according to specific embodiments. Thus, it is also possible to implement the invention in other embodiments, so that these FIGURES are only to be construed as examples. Moreover, in the FIGURES, like reference numerals designate corresponding modules or items throughout the different drawings.

FIG. 1 illustrates an example network system.

DETAILED DESCRIPTION OF THE DRAWINGS AND PREFERRED EMBODIMENTS

By way of introduction, the disclosed embodiments relate to systems and methods for metadata partitioning. The metadata may be from a distributed database that is partitioned based on rules for different buckets. The rules may be defined based on a defined set of syntax or using a predefined rule template. The partitioning may include dynamic adjustments and include auto detection for access patterns that are used for updating or creating new rules. Using fixed partitioning schemes based on row key hashing may not allow for the efficiency of the partitioning described in the scheme(s) below.

The rule based metadata partitioning may include a definition of a set of syntax. The syntax may be used to create rules. The rules may be used to identify the characteristic of the objects hierarchy, and describe the storage of the metadata in different partitions.

The rule based metadata partitioning may include a predefined rule template (e.g., WorkLoad Type) for some applications. It may automatically recognize and apply the WorkLoad Type when the application is putting objects to the bucket.

The rule based metadata partitioning may include a dynamic adjustment of the existing object metadata. The object metadata storage partition may be adjusted based on a rule. Both online and offline modes may be supported. With online mode, all objects in the bucket may be accessible during the adjustment.

The rule based metadata partitioning may include an auto detection of access patterns from the client requests. Based on the detection, existing rules may be improved to improve query performance. Also, based on the detection, new rules may be created to further improve query performance.

The rule based partitioning may be implemented in the example network system shown in FIG. 1 and described below. FIG. 1 illustrates an example network system 100. The system 100 may utilize rules for partitioning metadata, such as metadata for a database (e.g. database 106). The rule-based metadata partitioning is further described herein. In particular, the partitioner 112 may access the rules for partitioning (e.g. stored in the database 106) to partition a separate database (database 106 represents one or more databases, including a separate rules database and a database to be partitioned). The one or more databases 106 may be distributed over a network 104. In other embodiments, the database(s) 106 may also be connected directly with the partitioner 112. In one embodiment, the partitioner 112 may be software that runs on a computing device as shown in FIG. 1. The partitioner 112 may define and implement the metadata partitioning described herein.

The partitioner 112 may be one or more components for performing the rule-based metadata partitioning. The workflow analyzer may include a processor 120, a memory 118, software 116, and/or a user interface 114. In alternative embodiments, the partitioner 112 may be multiple devices to provide different functions and it may or may not include all of the user interface 114, the software 116, the memory 118, and/or the processor 120. In some embodiments, the partitioner 112 may be implemented in software on a distributed network system.

The interface 114 may be a user input device or a display. The user interface 114 may include a keyboard, keypad or a cursor control device, such as a mouse, or a joystick, touch screen display, remote control or any other device operative to allow a user or administrator to interact with the partitioner 112. The user interface 114 may communicate with any of the systems in the network 104, including the partitioner 112 or any other components in a distributed network system. The user interface 114 may include a user interface configured to allow a user and/or an administrator to interact with any of the components of the partitioner 112 for providing access and functionality for the rules or the partitioning. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the partitioner 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include a process for accessing/modifying the rules and then for partitioning metadata based on those rules.

The processor 120 may be coupled with the memory 118, or the memory 118 may be a separate component. In some embodiments, there may not be a memory 118 as part of the partitioner 112, which utilizes data from one or more separate database(s) 106, including the source code, the flowchart definition language, and the generated workflows. In some embodiments, the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures and/or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. In some embodiments, the system may be referred to as a distributed storage system for storing and hashing data. The network 104 may be a local area network ("LAN"), or may be a public network such as the Internet. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

Partition Rules

The rule based partitioning methods may handle various partition schema as discussed below.

For a Rule Condition and Method, the rule element may include: "Condition": "Method". The "Condition" may have 3 sub-parts: name, operator, value. The "name" part may include folder depth and folder name as criteria. The "operator" may support digital comparators and string equals/contains. The "value" may be a number, string or regular expression. The "Method" part may include folder depth and suffix length. In one example, conditions in JSON format will look like the following:

```
{
"n":"D",              <-- "name"
"o":"GE",             <-- "operator"
"v":"2"               <-- "value"
}
```

A partition rule may include a bucket rule and sub-partition rules. The bucket rule may be a default rule which applies to the whole bucket. Sub-partition rules may be stored as a list. New rules will append to the end of the list.

Each rule may only apply to the object names which can satisfy the conditions defined in the rule.

The rules may be applied with a strategy of "Most Recent First". That means the partitioner can start validating the rule from the bottom of the list. Once it satisfies the conditions, will stop further validation, and apply the current rule. If no condition matches, the bucket default rule applies. This can allow the new rule to override the previous rules.

Below are current support operators in the rule condition:

```
public enum RuleOperator {
    NA,              <- not applicable
    NULL,            <- is null
    NNULL,           <- is not null
    EQ,              <- equal to
    NE,              <- not equal to
    GE,                 <- greater or equal to
    GT,              <- greater or equal than
    LE,              <- lesser or equal to
    LT,              <- lesser or equal than
    CONTAIN,         <- string contains
    NCONTAIN,        <- string not contains
    START,           <- string starts with
    NSTART              <- string not starts with
    END,             <- string ends with
    NEND,            <- string not ends with
    MATCH,              <- string matches a regular expression
    NMATCH           <- string not matches a regular expression }
```

Current supported fields in the rule condition may include:

Fx: specific folder name, the number x is used to identify the level of the folder, F2 means folder name of folder level 2;

O: full object name, start with bucket name;

SP: full leading folders, without bucket name;

N: pure object name, without folders and bucket; and

D: folder depth.

For example, an object with the name:

bucket1/folder1/subfolder2/subfolder3/subfolder4/objectname

The following may be defined:

F2="subfolder2/"

O="bucket1/folder1/subfolder2/subfolder3/subfolder4/objectname"

P="folder1/subfolder2/subfolder3/subfolder4/"

N="objectname"

D=4

As a rule example:

```
{
    "bDep":1,
    "bSuf":0,
    "pRules":
        [
        {"id":0,
            "cond":[{"n":"D","o":"GE","v":"2"},{"n":"F2","o":"END","v":"2/"}],
            "dep":2,
            "suf":4,
            "st":true
        },
        {"id":1,
            "cond":[{"n":"D","o":"EQ","v":"0"},{"n":"O","o":"MATCH","v":"[a|b|c]"}],
            "dep":0,
            "suf":5,
            "st":false
        }
        ],
    "status":true
}
```

For a restriction, if a condition only contains [D]epth, it will be marked as invaild, e.g.

```
{           "id":0,
            "cond":[{"n":"D","o":"EQ","v":"0"}],
            "dep":0,
            "suf":5,
            "st":false
}
```

The default rule for a new bucket may be shown as:

{"bDep":3,"bSuf":0,"wlt":[ ],"pRules":[ ],"status":true, "dw":true}

The following details explain this example default rule:

```
{
"bDep":3,        <- Bucket level default depth: 3
"bSuf":0,        <- Bucket level default suffix length: 0
"Wlt":[ ]        <- Workload type assigned to this bucket.
"pRules":[ ],    <- Rules for partitions.
"status":true,   <- Status, true: active, false: inactive
"dw":true}       <- Dynamical Workload type recognizing,
}
```

A sample rule to create a partition for keys starting with: "adaprodreg1cdh/ada/data/T3/" includes:

```
{
    "pRules":[
        {
        "id":0,
        "cond":[
        {
        "n":"P",
        "o":"NSTART",
        "v":"adaprodreg1cdh/ada/data/T3/"
        }
        ],
        "dep":3,
        "suf":0,
        "ud":"",
        "st":true
        },
```

A sample rule for organizing keys with prefix "adaprodreg1cdh/ada/data/T3/" into depth 6 includes:

```
{
"id":1,
"cond":[
{
"n":"P",
"o":"START",
"v":"adaprodreg1cdh/ada/data/T3/"
}
],
"dep":6,
"suf":0,
"ud":"",
"st":true
},
{
"id":2,
"cond":[
{
"n":"P",
"o":"START",
"v":"adaprodreg1cdh/ada/data/T3/"
},
{
"n":"F6",
"o":"MATCH",
"v":"(DM_SG_T3_SGCCALYT|DM_SG_T3_FTRMT|DM_HK_T3_LIBHKADA)"
}
],
"dep":6,
"suf":6,
"ud":"",
"st":true
}
]
}
```

A sample rule to split the keys using the leading 16 characters of the object name includes:

```
{
"pRules":[
{
"id":0,
"cond":[
{
"n":"P",
"o":"START",
"v":"adaprodreg1cdh/ada/data/T3/HK/DM_HK_T3_LIBHKADA/UL_ACCT_CYCL
E_ED/"
}
],
"dep":7,
"suf":16,
"ud":"",
"st":true
},
}
```

There may be a bucket folder pattern of known backup vendors. For example, for Veeam, it may start with the folder name "Veeam/Archive/" for the first 1 and 2 levels. Backup data is stored in the 7th level folder.

```
{
"bDep":3,
"bSuf":0,
"pRules":
[
{"id":0,
"cond": [{"n":"P","o":"START","v":"Veeam/Archive/"}],
"dep":4,
"suf":0,
"st":true
},
```

-continued

```
{"id":1,
    "cond":[{"n":"P","o":"START","v":"Veeam/Archive/"},{"n":"D","o":"GE","v":"7"}],
    "dep":7,
    "suf":0,
    "st":true
    }
],
"status":true
}
```

For a Commvault example, the folder structure may be: bucketname→Mountpointname (created by CV)→CV_MAGNETIC→virtualvolume_numbers (could be thousands at this level here)→Chunk_number_folder (cloud be many here)→actual chunk stored here (can be 8 MB or 32 MB in some examples). For example: long-term-retention/BPPM-OC_12.16.2019_15.07/CV_MAGNETIC/V_2771585/CHUNK_46402758/S FILE_CONTAIN ER.idx.SIZE The keyword "CV_MAGNETIC" is used in folder level 2 to identify the bucket used by Commvault. The example rule may include:

```
{
  "bDep":3,
  "bSuf":0,
  "pRules":
    [
      {"id":0,
        "cond":[{"n":"D","o":"GE","v":"3"},{"n":"F2","o":"EQ","v":"CV_MAGNETIC/"}],
        "dep":3, "suf":-
        5, "st":true
        }
    ],
  "status":true
}
```

For a NetBackup example, backup data may store under folder level 1. The folder name starts with the node name, such as:

rex2adm03vm05bkp.wfm.wegmans.com_1611970631_C3_F1_R2_COMPR_ENCR_META DATA/

The example rule may include:

```
{
"bDep":3,
"bSuf":0,
"wlt":["NETBACKUP"],
"pRules":
[
  {"id":0,
  "cond":[{"n":"D","o":"EQ","v":"1"},{"n":"F1","o":"MATCH","v":"^[a-zA-Z0-9\\-\\.]+_\\d{9,}_\\w+/$"}],
  "dep":1,
  "suf":4,
  "ud":"_",
  "st":true
}
],
"status":true,
"dw":true
}
```

For a Rubrik example, the folder structure may start with blobstore or snappables, followed by 2 subfolders with 3 digitals in the name, such as: blobstore/001/112/or snappables/001/112/

The example rule may include:

```
{
  "bDep":3,
  "bSuf":0,
  "pRules":
    [
      {"id":0,
        "cond":[{"n":"D","o":"EQ","v":"3"},{"n":"P","o":"MATCH","v":"^\\w+/\\d{3}/\\d{3}/"}
        ],
        "dep":3,
        "suf":0,
        "st":true
      } ],
  "status":true
}
```

For an Actifio example, the folder structure may start with folder name "ActifioOnVaultv2". The example rule may include:

```
{
  "bDep":3,
  "bSuf":0,
  "pRules":
    [ {"id":0,
        "cond":[{"n":"F1","o":"EQ","v":"ActifioOn Vaultv2/"}],
        "dep":6,
        "suf":0,
        "st":true
      } ],
  "status":true
}
```

For a Cohesity example, the folder structure may start with the folder name "cohesity":

cohesity/cloudspill/4061830642976178/2197537406/
    chunk_repository/cfile_data/25/79/
    15538169624.41949719
cohesity/cloudspill/4061830642976178/2197537406/
    chunk_repository/cfile_data/25/79/
    15559124760.42231969

The example rule may include:

```
{
  "bDep":3,
  "bSuf":0,
  "pRules":
    [ {"id":0,
        "cond":[{"n":"F1","o":"EQ","v":"cohesity/"}],
        "dep":6,
        "suf":0,
        "st":true
      } ],
  "status":true
}
```

For a Nasuni example, all objects may reside under the root folder, object name starts with a number. For example:

nasunifiler83e735cd-8fab-4200-a852-7f80c101dfa5-0-0/
    1.uni3dF34Fa2-1591486777-1922069
    nasunifiler83e735cd-8fab-4200-a852-7f80c101dfa5-0-
    0/1.uni3dF34Fa2-1591486777-1922070

The example rule may include:

```
{
  "bDep":3,
  "bSuf":0,
  "wlt":["NASUNI"],
  "pRules":
  [
  {"id":0,
  "cond":[{"n":"D","o":"EQ","v":"0"},{"n":"N","o":"MATCH","v":"^[0-9]+\.[a-zA-Z0-9]+\-
  \d{9,}\-\d+$"}],
  "dep":1,
  "suf":4,
  "ud":"-",
  "st":true
  }
  ],
  "status":true,
  "dw":true
}
```

Sample hash: "1.uni3dF34Fa2-1591" for object "1.uni3dF34Fa2-1591486777-1922070".

For a User Defined Workload Type, users may define their own workload type. The system may preserve 50 workload type names in one example (e.g. from UDEF001 to UDEF050) for User Defined Workload Type. There may be a JXM call to add User Defined Workload Type:

```
{
  "udWLTName":"UDEF001",
  "udConditions": { "id":0,
      "cond":[{"n":"P","o":"START","v":"myworkload"}],
      "dep":3,
      "suf":0,
      "st":true
    },
  "udRuleItems":
    [
    {"id":0,
      "cond":[{"n":"P","o":"START","v":"myworkload"}],
      "dep":4,
      "suf":0,
      "st":true},
      {"id":1,
      "cond":[{"n":"P","o":"START","v":"myworkload"},{"n":"D","o":"GE","v":"7"}],
      "dep":7,
      "suf":1,
      "st":true}
    ]
}
```

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kinds like a client-server architecture or an Internet/browser network) in which the invention may be implemented. The invention will be described in the general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like.

Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form of a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memory (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the FIGURES), such as a microphone, a joystick or a mouse. Additionally, interfaces to other systems might be used. These and other input devices are often connected to the processing unit through a serial port interface coupled to the system bus. Other interfaces include a universal serial bus (USB). Moreover, a monitor or another display device is also connected to the computers of the system via an interface, such as a video adapter. In addition to the monitor, the computers typically include other peripheral output or input devices (not shown), such as speakers and printers or interfaces for data exchange. Local and remote computers are coupled to each other by logical and physical connections, which may include a server, a router, a network interface, a peer device or other common network nodes. The connections might be local area network connections (LAN) and wide area network connections (WAN) which could be used within the intranet or internet. Additionally, a networking environment typically includes a modem, a wireless link or any other means for establishing communications over the network.

Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

What is claimed is:

1. A method for metadata partitioning comprising:

accessing rules for the metadata partitioning for storage in distributed storage nodes, wherein the rules are automatically created based on a set of syntax and comprises both bucketing rules and sub-partition rules;

utilizing a predefined rule template associated with the rules, the predefined rule template being automatically recognized when bucketizing objects;

adjusting, dynamically, existing object metadata partitioning;

detecting, automatically, access patterns from client requests for improving the rules and for automatically creating new rules for the metadata partitioning, the new rules being created at least to overcome a scalability limitation of a single node in the distributed storage node for storing one partition and to improve query performance in reading metadata across a range of keys; and storing the metadata partitioning in the distributed storage nodes.

2. The method of claim 1, wherein the rules are defined for different buckets.

3. The method of claim 2, wherein the set of syntax is used to create rules.

4. The method of claim 1, wherein the rules identify characteristic of an object hierarchy, and describe a storage of the metadata in different partitions.

5. The method of claim 1, wherein the predefined rule template is utilized for certain applications.

6. The method of claim 1, wherein an object metadata storage partition is adjusted based on one of the rules.

7. A system comprising a memory for storing instructions and at least one processor configured to execute the instructions to:

access rules for metadata partitioning for storage in distributed storage nodes, wherein the rules are automatically created based on a set of syntax and comprises both bucketing rules and sub-partition rules;

utilize a predefined rule template associated with the rules, the predefined rule template being automatically recognized when bucketizing objects;

adjust, dynamically, existing object metadata partitioning;

detect, automatically, access patterns from client requests for improving the rules and for automatically creating new rules, the new rules being created at least to overcome a scalability limitation of a single node in the distributed storage node for storing one partition and to improve query performance in reading metadata across a range of keys; and store the metadata partitioning in the distributed storage nodes.

8. The system of claim 7, wherein the rules are defined for different buckets.

9. The system of claim 8, wherein the set of syntax is used to create rules.

10. The system of claim 7, wherein the rules identify characteristic of an object hierarchy, and describe a storage of the metadata in different partitions.

11. The system of claim 7, wherein the predefined rule template is utilized for certain applications.

12. The system of claim 7, wherein an object metadata storage partition is adjusted based on one of the rules.

* * * * *